2,873,816
GAS WASHING APPARATUS

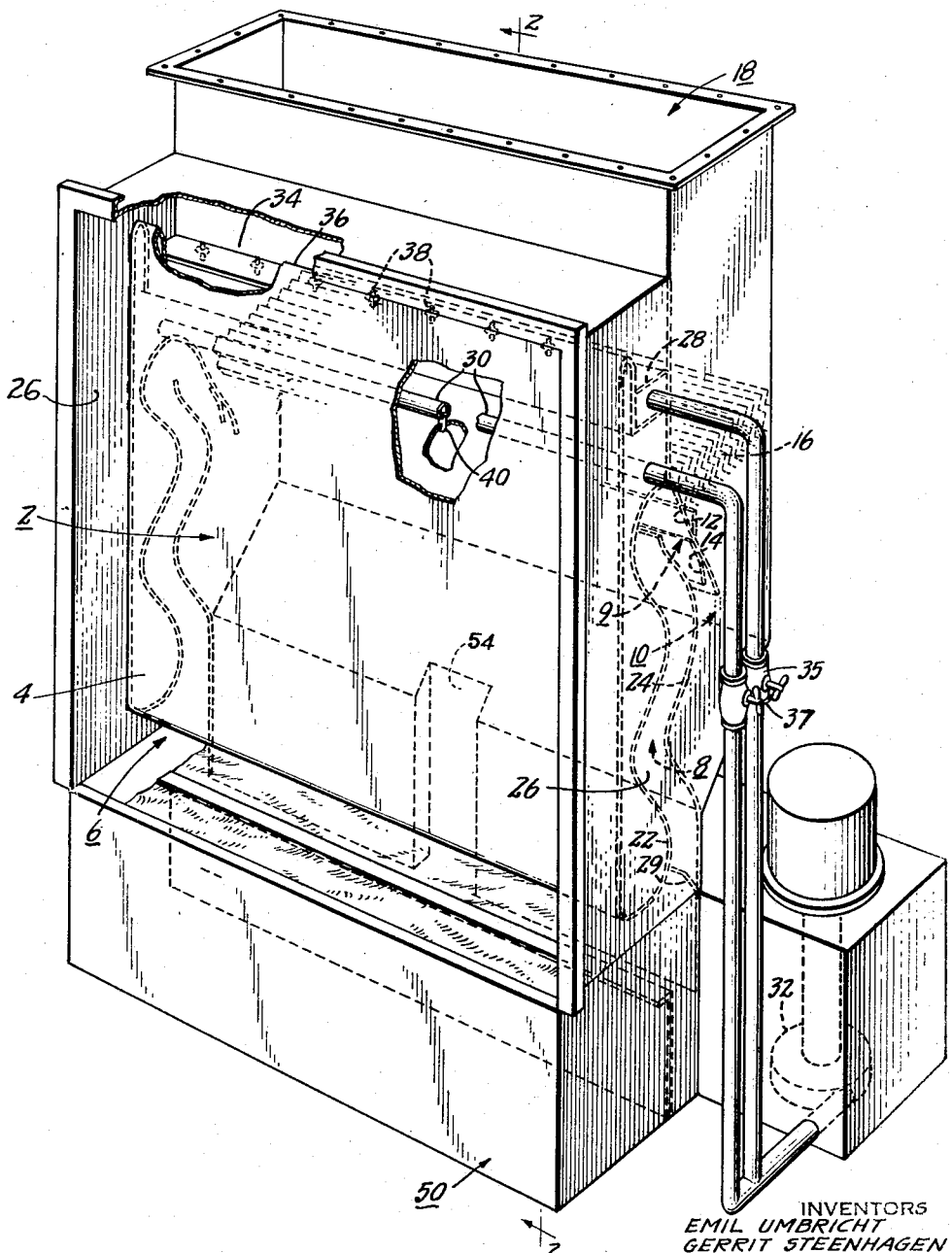

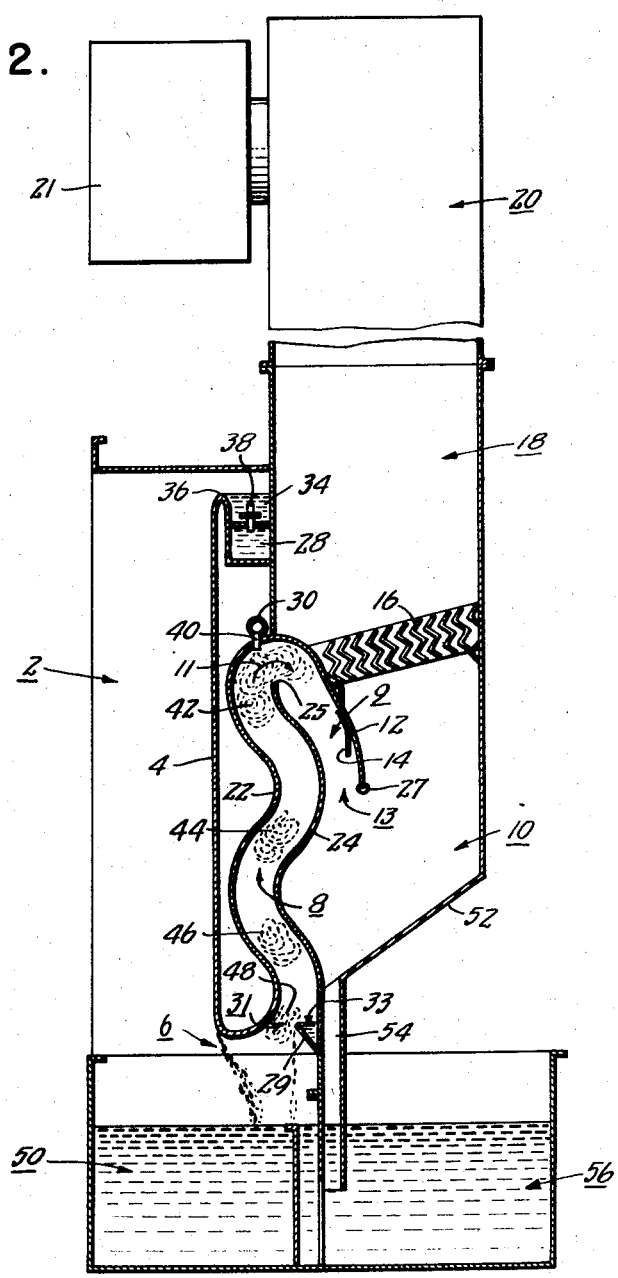

Emil Umbricht, Jackson, Gerrit Steenhagen, Dearborn, and Willard L. Johnson, Royal Oak, Mich., assignors to Ajem Laboratories, Inc., Detroit, Mich.

Application June 16, 1955, Serial No. 515,997

8 Claims. (Cl. 183—26)

The present invention relates to air washing apparatus of the type used for removing particles, such as dust or paint spray from the air. Such air washers are used, for example, in connection with paint spray booths to prevent the over-spray from being discharged into the atmosphere, and in some instances to permit the recovery and reuse of the over-spray. They are used also to remove dust and other foreign particles from the atmosphere in industrial applications. This air washing apparatus is particularly advantageous in obtaining an intimate and effective contact between the air being washed and the liquid used in washing the air and is thoroughly effective in removing from the air both this washing liquid and foreign material collected by the liquid. The foreign material is then removed from the liquid, which may be recirculated in the air washing cycle again and again. This invention is in the nature of an improvement on the air washing apparatus disclosed in our copending application filed on September 24, 1954, under Serial No. 458,336.

The apparatus described in the prior application is highly satisfactory and effective in many installations. The improved apparatus described herein is particularly suited for heavy duty operation, for example, for use with paint spray booths where the volume of the over-spray material is great and substantially complete removal of this overspray from large volumes of air is required. In addition this improved apparatus provides a flexibility in operating conditions wider than the apparatus described in said copending application. The apparatus described herein provides optimum air washing action in various types of industrial installations combined with substantially complete scavenging of the washing liquid from the air stream prior to discharge of the air from the apparatus.

In some types of air washers now in use a dense, high velocity liquid spray is produced by mechanically moving members such as rotating cages or propellor blades. The air to be washed is then forced at relatively high velocity through the liquid spray. In such air washers some of the moving parts are exposed to the spray, thus making it necessary to provide special arrangements to protect the bearings of the apparatus from the liquid, and in some instances, subjecting the moving parts to excessive abrasion. Moreover, although such washers are highly effective, substantial motive power is required to form the high velocity spray.

In other types of air washers, the liquid spray is produced by a series of nozzles to which the liquid is supplied under high pressure. With systems of this latter type it is difficult to obtain a spray of sufficient depth and uniformity to provide adequate cleaning action for many industrial operations. Thus, for example, in air washers of this type as well as in other types, there is some tendency for the air stream to form into channels and follow open spaces through the spray so that no washing action takes place in these regions.

Still other types of washers have a series of baffles which form a curtain of water as the water runs off the end of one baffle and falls onto the surface of a lower baffle. A counter-current of air to be washed is passed through the baffle structure so that a certain amount of washing takes place as the curtains of water are broken into a spray by the action of the counter current of air. Washing apparatus of this counter-flow baffle type has a number of advantages in that moving parts are eliminated from the washing regions and the cost of construction is low. Such washing arrangements previously used have several shortcomings, however, and have thus far achieved only limited acceptance in industrial operations. For example, they tend to clog in handling materials that are tacky or sticky, or which become so when wetted with water. The materials washed from the air collect on the surfaces of the air cleaner and they are difficult to clean.

Thus, it is important that all of the surfaces be wet continuously with a film of water and that there be no abrupt discontinuities in the surfaces which would provide a focal point for the collection of solid material.

In accordance with the illustrative embodiment of the present invention described herein, an air washing device is provided which has the advantages of the baffle washing system described above; for example, it requires minimum motive power because no mechanical spray-producing device such as a cage or propellor is required, it is simple in construction, and, in addition, provides a smooth continuous undulating surface wet continuously with a film of water and free from all abrupt discontinuities and arranged to produce a series of dense, highly efficient spray regions.

The washing unit in which the invention is embodied in the description below provides a compact unit capable of washing large volumes of air rapidly and effectively and which may be used for many different applications with no more than minor changes in construction. For example, the apparatus may be used to remove the over-spray from spray booths, to remove particles of solid or liquid contaminants from air or other gas, to remove soluble gases from air, to aerate chemical reagents, and to promote chemical reactions in which a gaseous material is reacted with solid or liquid particles.

Among the advantages of the improved apparatus described herein are those resulting from the fact that the air stream is bent into an abrupt U-turn directed downwardly and then rapidly decelerated so as to throw out of the air any foreign particles and droplets of the washing liquid contained therein. Moreover, this improved arrangement enables a considerably wider variation in the air velocity through the washer, thus accommodating varying operational requirements in different installations and under many different conditions of use. Also, the amount of liquid flow can be adjusted over a wide range, thereby obtaining highly effective washing action under varying conditions encountered in different industrial applications, while obtaining substantially complete removal of the washing liquid droplets from the washed air.

The foregoing and other objects of the present invention will be in part apparent from and in part pointed out in the following description of a preferred embodiment of the invention and related forms of apparatus, considered in conjunction with the accompanying drawings, in which:

Figure 1 is a perspective view, partly in phantom, of an air washer adapted for spray booth operation and embodying the present invention:

Figure 2 is a vertical sectional view of the apparatus taken generally along line 2—2 of Figure 1.

As shown in Figures 1 and 2, the improved air washing apparatus of the present invention has certain features similar to those of the apparatus described in our prior copending application identified above. Some of these features of the prior apparatus are described herein for the purpose of explaining how the improvements embodied in this apparatus cooperate therewith, thus giving a more complete understanding of the advantageous operating characteristics and of the improvements embodied in this present apparatus.

The spray booth comprises an area, generally indicated at 2, where the articles are sprayed with paint. The rear wall of this booth is formed by a panel or flood-sheet 4 extending substantially from the top to the bottom of the booth. This flood-sheet 4 provides a paint-collecting surface which is continuously covered with a moving curtain of the air washing liquid, which is here described as water and may contain certain wetting agents, coagulants, anti-coagulants, floating agents, anti-foam agents, and the like. It is to be understood that in certain installations other air washing liquids may be used, depending upon the characteristics required. Arrangements such as the flood-sheet 4 are commonly used in spray booths and are effective in trapping a certain portion of the over-spray.

To collect the over-spray which does not impinge upon this curtain of water, a continuous flow of air is maintained from the outside through the spray region 2 and thence through an opening 6 beneath the flood-sheet 4 and upwardly through an undulating air washing region 8, similar to that shown in our above copending application. In this embodiment of the present invention, however, the air flow is then turned in a U-turn or hairpin type curve 11 and is redirected in a downwardly direction by a back panel 12 and a deflector plate 14. Thus, the air passes through a second air washing region 9 where further intimate contact between the air stream and the air washing liquid occurs. The washed air is then blasted down from discharge region 13 into an enlarged lower washing-liquid scavenging-chamber 10 wherein the air is suddenly decelerated and the direction of the air is again reversed. The air is drawn upwardly through a moisture eliminator 16 into the upper stack chamber 18, and then through a blower 20 driven by a motive source 21. From blower 20 the air is discharged into the atmosphere or otherwise disposed of.

The first air washing region 8 is defined by a forward panel 22 and a rear panel 24. These two curved panels, in this example, are spaced about six inches apart throughout most of their lengths and are closed at the sides by a pair of end-panels 26. Their configuration is disclosed more fully and claimed in our above copending application. The rear panel 24 terminates at ridge 25 approximately at the center of curvature of the U-bend 11, and the forward panel 22 described an arc rearwardly up and over the ridge 25, approximately a 180 degree turn, then continuing in a downward direction forming the back panel 12. This back panel is generally parallel to rear panel 24 and terminates at an exit point 27 at a level approximately mid-way between ridge 25 of rear panel 24 and the level of opening 6.

As the air enters the first washing region 8 through opening 6 it is sharply directed upward at a high velocity by an accelerator plate 29. The narrowing of the intake region 31 by the accelerator plate 29 forces the contaminated gas rapidly to accelerate, abruptly change direction and impinge upon plate 29 thereby removing the heavy contaminating particles at the outset of the cleansing process. As the collector area 33 of the accelerator plate fills with liquid removal of the particles from the contaminated gas is further aided by the continuous overflow of liquid from area 33 into intake region 31. Since the location of the accelerator plate is easily accessible from the bottom of the apparatus there is presented no problem to the cleaning of the collector area 33 to remove therefrom any overspray material carried down the inner surface of panel 24 by the liquid.

A liquid supply duct 28 extends the full width of the flood-sheet 4, and a parallel water supply pipe 30 extends the full length of forward panel 22 approximately directly over the U-bend 11. Water is supplied to the supply duct 28 and supply pipe 30 at a constant pressure by a centrifugal pump 32 through control valves 35 and 37. The flow of water into trough 34 and over the forward lip 36 to provide a curtain of water on flood-sheet 4, is regulated by valves 38. A substantially uniform spray of water into the undulating air washing region 8 is provided by closely spaced spray nozzles 40 arranged along the supply pipe 30.

The water from the spray nozzles 40 flows downwardly through the region 8 and is in excess of the quantity required to wet completely the inner surfaces of the panels 22 and 24. It is desirable to discharge this spray from the nozzles 40 at a velocity approximately equal to but in the opposite direction from the ascending air passing through the washing region 8. Part of the water discharged by nozzle 40 collects on the surface of panels 22 and 24 thereby maintaining a moving film of water over the entire surface of both panels. As the film of water continues along the inner surface of the sinuous panels 22 and 24 the excess over the amount which will cling to the inner walls falls across the washing region 8 and impinges upon the opposite panel.

This water, which would fall as a substantially continuous curtain of water across the air washing region if it were not for the draft of air moving upwardly through the space between the panels 22 and 24, is broken up by the action of the air stream, as indicated diagrammatically at 42 in Figure 2.

Then the action of the upwardly moving air plus the spray water from the nozzles which does not collect on the panels creates a highly turbulent condition in the region 42 tending to form a dense whirling fog of water, air and foreign matter that extends substantially completely across the space between the panels 22 and 24 and also extends horizontally the full length of these panels so that all of the air passing upwardly between the panels 22 and 24 must pass through this dense whirling fog. This turbulent condition extends around the U-turn 11 into region 9, and is extremely effective in promoting final complete purging.

This swirling action is repeated as the water continues its downward movement along the inner surface of panels 22 and 24 thereby forming successive turbulent air washing regions 44, 46 and 48.

The water which forms the swirl 42 is collected on the inner surface of the panels 22 and 24 and flows downwardly along the surface of this panel until it reaches the region indicated at 44 in Figure 2, whereupon a portion of the water continues to follow the inner surface of the panel 22 and maintains a moving film of water over its entire surface, and the excess water leaves the surface of panel 22 and falls downwardly toward the inner surface of panel 24. Here also the air stream breaks the water into a dense spray 44 through which the air stream is forced to pass. The water from this spray then falls downwardly upon the inner surface of the panel 24 and continues its downward movement to form successive turbulent air washing regions indicated at 46 and 48.

The water forming the bottom end of the air washing region 8 is collected in a tank 50; the sludge is removed from the water; and the water is then pumped back into supply duct 28 and supply pipe 30.

The rear panel 24 continues downwardly below the level of the flood-sheet 4 to a position below the level of the liquid in the tank 50, so that all of the air which flows through the washing region 8 is drawn from the forward side of the flood-sheet 4.

The ascending air passing through washing region 8 is redirected rearwardly by the 180 degree bend of front panel 22 so that the ladened air passes over the top of ridge 25 of back panel 24 and is directed downwardly through back air washing region 9 formed by rear panel 24 and an extension of the U-turn which forms panel 12. The air entering U-turn region 11 has been successively scrubbed by the serpentine action through air washing region 8 but as the contaminated air enters U-turn region 11 it is subjected to the full force of the washing liquid from nozzles 40. The nozzles create a dense fog of rapidly moving liquid across the entire area of U-turn region 11 and the action of the ascending air as it is directed in a circular clockwise direction creates in region 11 a rapidly swirling turbulent mass which further coagulates the contaminating particles and thereby assures precipitation. Further the turbulent circular action of the mass centrifugally drives these coagulated and heavier particles to the periphery of the swirling fog where they are flung out impinging upon the wetted panel surface and then floated away by the continuously moving film of water.

In order to accelerate the air stream downwardly at 13 and produce a more abrupt deceleration thereof into the scavenging chamber 10, the director plate 14 extends across the inner surface of the back panel 12 above exit point 27 with the lower edge of this deflector directed substantially straight down and slightly converging with a rearward undulation of the back panel 24.

The velocity of the descending washed liquid-ladened air is further increased by the narrowing of back air washing region 9 by means of deflector plate 14. As the air is blasted into lower chamber 10 from discharge region 13 the velocity of the air is rapidly decreased by the sudden increase in area while the heavier liquid droplets and foreign particles continue to fall toward back wall 52 because of their greater inertia, resulting in most of the remaining moisture and foreign particles being thrown out or impinged upon the sloping back wall 52.

As the velocity of the air is decreased the air is also directed rearwardly and upwardly by the action of the blower 20. The velocity of ascent is much less than in air washing areas 8 and 9 because of the large area of lower chamber 10. Thus the combining of the few remaining small droplets of liquid and foreign particles and their subsequent precipitation is enhanced. The liquid and foreign material precipitated from the air in the scavenging chamber 10 drains down the sloping back panel 52 and down a central down-spout 54 into rear tank 56.

In order to prevent any of the few droplets or particles which remain air-borne in the scavenging chamber from being carried out through the blower 20, a plurality of baffles are arranged to form the moisture eliminator 16 which is located between lower chamber 10 and stack chamber 18. In this example the baffles are formed by a series of spaced metal sheets having V-shaped corrugations arranged so that the air passing through the chamber 10 is forced to follow a zig-zag path before entering exit chamber 18. The sudden change in direction of the air in the moisture eliminator 16 causes any remaining droplets or particles to be deposited on the metal sheets, and upon passing through the labyrinth of baffling the few remaining particles are thereby removed.

The moisture eliminator 16 is slanted toward back panel 12 at an angle of about 5 degrees which permits any liquid droplets collected thereby to drain to the side of the eliminator and down the outside of panel 12 where the exit velocity of the air at discharge region 13 accelerates the droplets into back panel 52. By this draining operation the eliminator is kept free of liquid and the efficiency of the unit is maintained at high level.

The liquid is circulated from the front tank 50 through a suitable port in the apparatus and then into the rear tank 56 where suitable sludge removal means are used to clean the over spray material from the liquid prior to its circulation by pump 32. This cleaning and recirculation cycle of the liquid is described in detail and claimed in our above identified copending application.

The advantageous features of spacing, curvature and general arrangement of the panels 22 and 24 is more fully disclosed and claimed in our copending application which is identified above.

It will be noted that all surfaces within the air washing regions 8 and 9 are continuous, and form smooth curved surfaces, which are continuously wet with a moving film of liquid. Discontinuities are avoided and a film of water is maintained over these surfaces, preventing the collection of foreign material especially those which are inherently sticky or become sticky when wet. In addition, the smooth undulations shown avoid undesired eddy currents which would produce a tendency for the collection of contaminating materials and which increase the resistance to air flow without providing a corresponding increase in washing action.

This particular apparatus is adapted to handle a wide range in air velocity. For example an air velocity in the range from about 1,000 to about 2,500 linear feet per minute is easily handled with a water flow from the nozzles 40 at approximately in the range from 100 to 500 gallons per minute. This has been found to produce an effective washing action of as much as 8200 C. F. M. with a blower pressure differential of 3.8 inches of water, which is highly satisfactory under many different industrial applications. In the apparatus described above a pressure drop corresponding to about two to four inches of water was found sufficient to produce the necessary air velocity for a wide range of applications.

Although in the accompanying drawings we have shown a preferred embodiment of our invention and have described the same and various modifications thereof in this specification, it is to be understood that these are not intended to be exhaustive but, on the contrary, are chosen for the purpose of illustrating the invention in order that others skilled in the art may so fully understand the invention, its principles and the application thereof that they may embody it and adapt it in numerous forms, each as may be best suited to the requirements of its particular use, without departing from the scope of the following claims.

We claim:

1. In a gas washing apparatus for producing intimate contact between a liquid and a gas and wherein said apparatus includes first and second curved walls, means supporting said walls in generally upright spaced relationship defining a serpentine path therebetween, the inner surface of said walls being smooth and continuous and free from abrupt discontinuities, means for supplying said liquid to an upper portion of said path, and means for simultaneously forcing said gas upwardly along said path between said walls; the improvement comprising: said walls defining a U-turn in said path at its uppermost point redirecting said gas downwardly, said liquid supplying means comprising a plurality of liquid jets directed downwardly into said path counter to the gas flow and being positioned at said U-turn, and an accelerator plate inclined downwardly from one of said walls toward the other and defining a constriction in said downward path whereby the velocity of said washed gas therein is increased, and means defining an enlarged deceleration chamber into which said washed gas is discharged at high velocity after passing said accelerator plate.

2. A gas washing apparatus for producing continuous intimate contact between a liquid and a contaminated gas comprising means for supplying a contaminated gas to be cleaned and means for cleaning said gas including a pair of walls defining an upwardly extending serpentine passage having a lower approximately horizontal entrance, whereby the gas in passing through said horizontal entrance into said upwardly extending passage changes direction, a supply of liquid descending said passage, and a baffle forming an abrupt constriction near the back side of said lower entrance to said passage, said baffle extending forwardly and upwardly from the back side of said lower entrance and defining a lip near the other side of said entrance, said baxe defining a liquid-retaining trough, and washing liquid spilling over said lip forming a liquid curtain whereby said gas strikes against said liquid curtain and baffle in changing direction as it flows into the entrance of said passage.

3. A gas washing apparatus for producing continuout intimate contact between a liquid and a contaminated gas comprising means for supplying a contaminated gas to be cleaned, means for cleaning said gas including substantially vertical surface portions adapted to carry a continuous moving sheet of liquid thereon and forming a flood sheet, said surface portions having a lower limit, said sheet of liquid falling from the lower limit of said surface portions and forming a liquid curtain, a liquid reservoir positioned beneath said lower limit and catching said liquid curtain, a pair of walls defining an upwardly extending serpentine passage behind said flood sheet and having a lower entrance adjacent the lower limit of said flood sheet, said lower entrance passing horizontally through said liquid curtain and curving upwardly to join said passage, a baffle on the rear wall opposite said lower entrance, said baffle projecting forwardly and upwardly into the upwardly curved portion of said lower entrance and having a rim forming an abrupt constriction near the lower entrance to said passage, said baffle defining a liquid-retaining trough, said liquid flowing over said lip and forming a second curtain of liquid falling from said baffle whereby said gas to be cleaned after passing through said first curtain of falling liquid is forced abruptly to change direction upon entrance to said passage and any heavier contaminants carried by said gas impinge upon said second liquid curtain and baffle and are thereby removed from said gas before entering said serpentine passage.

4. A gas washing apparatus for producing continuous intimate contact between a liquid and a contaminated gas to be cleaned comprising first and second walls arranged in a generally upright spaced relationship defining a serpentine path having a series of S-shaped curves, an upper portion of one of said walls being curved downwardly and producing a U-turn in said path, a further downward extension of said path, a deflector plate forming a constriction in said downward path, a plurality of walls forming a chamber having a relatively large cross-sectional area of said path, an inclined plate forming an inclined back wall of said chamber, said chamber having an exit relatively near the top, whereby the gas must substantially reverse direction in said chamber after discharging from said path.

5. In a gas washing apparatus for producing intimate contact between a liquid and a gas and wherein said apparatus includes front and rear curved walls, means supporting said walls in generally upright spaced relationship defining a serpentine path therebetween, the inner surfaces of said walls being smooth and continuous and free from abrupt discontinuities, means for supplying said liquid to an upper portion of said path, a liquid reservoir extending beneath said path and spaced therefrom and catching liquid falling from said path, said front wall having a lower portion which is curved from the vertical forwardly into substantially parallel relationship with the surface of the liquid in said reservoir and defining an entrance into said path entering horizontally over said liquid surface and then curving upwardly in front of said rear wall, and means for simultaneously forcing said gas inwardly through said entrance and then curving upwardly and passing upwardly along said path between said walls; the improvement comprising: an accelerator plate secured to the rear wall opposite said entrance and inclined forwardly and upwardly therefrom and having a rim in close proximity with said curved lower portion of the front wall and defining an abrupt constriction as said entrance curves upwardly into said path, said accelerator plate and rear wall defining a liquid retaining trough, said liquid spilling over the upper rim of said accelerator plate and trapping heavier particles in said entering gas.

6. Air washing apparatus for washing contaminated air from an industrial booth including a substantially vertical floodsheet having an upper lip and a lower limit, a trough behind said upper lip, a first liquid conduit connected to said trough for supplying liquid to said trough and over said lip to the floodsheet, means defining a liquid reservoir spaced beneath the lower limit of said floodsheet, the lower limit of said floodsheet and said reservoir defining an air intake with the liquid falling from said lower limit into said reservoir forming a liquid curtain across the intake, a pair of spaced sinuous walls defining a substantially vertical serpentine passage communicating at its lower end with said intake, said walls defining a substantially 180° U-turn at the upper end of said serpentine passage and defining a downward path having a discharge, a plurality of liquid jets directed down counter to the air flow in said serpentine passage, a second liquid conduit connected to said jets, a plurality of walls defining a deceleration chamber having a relatively large cross sectional area, said discharge being directed down into said chamber, a drainage passageway at the bottom of said chamber communicating with the liquid in said reservoir beneath the surface thereof, said chamber having an outlet at an elevation above said discharge, a suction blower communicating with said outlet, and a liquid pump having an intake communicating with said reservoir and a discharge communicating with said conduits.

7. Air washing apparatus for washing contaminated air from an industrial booth including a substantially vertical floodsheet having a horizontal upper lip and a lower limit, a trough behind said upper lip, a first liquid conduit connected to said trough for supplying liquid to said trough and flowing over said lip to the floodsheet, means defining a liquid reservoir spaced beneath the lower limit of said floodsheet, the lower limit of said floodsheet and the surface of the liquid in said reservoir defining an air intake, the liquid falling from said lower limit into said reservoir forming a liquid curtain across said intake, a pair of generally upright spaced sinuous walls defining a substantially vertical serpentine passage communicating at its lower end with said intake, an upwardly inclined baffle secured to one of said walls near said intake forming a second trough and having a substantially horizontal lip with liquid flowing over said lip forming a second liquid curtain, said sinuous walls defining a substantially 180° U-turn at the upper end of said serpentine passage and defining a downward path having a discharge, a plurality of liquid jets directed down counter to the air flow in said serpentine passage, a second liquid conduit connected to said jets, a plurality of walls defining a deceleration chamber having a relatively large cross sectional area, said discharge being constricted and being directed down into said chamber for directing the gas downwardly at high speed into said chamber, a drainage passageway at the bottom of said chamber communicating with the liquid in said reservoir beneath the surface thereof, said chamber having an outlet at an elevation above said discharge, a suction blower communicating with said outlet, and a liquid pump having an intake communicating with said reservoir and a discharge communicating with said conduits.

8. Gas washing apparatus for producing continuous intimate contact between a liquid and a contaminated gas to be cleaned including intake means for introducing to said washing apparatus a contaminated gas to be washed by said liquid, a plurality of sinuous curved walls uniformly spaced and defining a serpentine passage of substantially uniform cross sectional area extending upwardly from said intake means, said serpentine path having a plurality of S-shaped curves in successive concave and convex configurations with said path entirely crossing and recrossing a straight line, a U-turn at the uppermost point of said serpentine passage redirecting the gas downwardly, a plurality of liquid jets at said U-turn directed counter to the gas flow and introducing liquid in excess of that required to form a film of liquid upon said walls for wetting the contaminants in said gas prior to passing said U-turn, whereby the heavier particles suspended in said gas will be centrifugally driven to the periphery of said passage by the sudden downward redirection of said gas at said U-turn and the heavier particles thereby impinged upon the outer one of said walls at said U-turn and be held thereon by the surface tension of said film of liquid, a downward extension of said outer wall defining a discharge from said passage, a deflector plate extending downwardly and inwardly from said extension at said discharge, whereby any of the liquid blown down along said extension and onto said deflector plate is carried into the discharge, means defining a relatively large deceleration chamber with a liquid reservoir therebeneath, said deceleration chamber having a lower drainage passageway opening beneath the surface of the liquid in said reservoir, said discharge flowing downwardly into said deceleration chamber, said chamber having an outlet at an upper portion thereof at an elevation higher than said discharge, whereby the gas is abruptly decelerated and directed upwardly in said chamber and said drainage passageway is sealed against gas leakage by the liquid in said reservoir.

References Cited in the file of this patent

UNITED STATES PATENTS

| | | |
|---|---|---|
| 816,371 | Platz | Mar. 27, 1906 |
| 1,978,938 | Grob | Oct. 30, 1934 |
| 2,077,427 | Lissman | Apr. 20, 1937 |
| 2,180,586 | Gustafsson | Nov. 21, 1939 |
| 2,316,491 | Teichner | Apr. 13, 1943 |
| 2,485,849 | Simmons | Oct. 25, 1949 |
| 2,583,171 | Green et al. | Jan. 22, 1952 |
| 2,643,736 | Smith | June 30, 1953 |
| 2,648,395 | Pond | Aug. 11, 1953 |
| 2,719,705 | Watson | Oct. 4, 1955 |

FOREIGN PATENTS

| | | |
|---|---|---|
| 950,095 | France | Mar. 14, 1949 |